United States Patent [19]

Kawai et al.

[11] Patent Number: 4,561,691
[45] Date of Patent: Dec. 31, 1985

[54] SAFETY DEVICE FOR ELECTROMECHANICAL OPENING AND CLOSING MECHANISM

[75] Inventors: Taneichi Kawai, Anjo; Mituyoshi Masuda, Nagoya, both of Japan

[73] Assignee: Aisin Seiki Kabushiki Kaisha, Kariya, Japan

[21] Appl. No.: 537,582

[22] Filed: Sep. 30, 1983

[51] Int. Cl.⁴ .......................... B60J 7/04; E05F 15/14; H02P 3/00

[52] U.S. Cl. .................................... 296/216; 296/217; 296/223; 49/28; 318/484

[58] Field of Search ................. 296/216, 220, 221–222, 296/223, 217; 49/26, 28; 361/31; 318/285, 474, 484

[56] References Cited

U.S. PATENT DOCUMENTS

| | | | |
|---|---|---|---|
| 3,612,950 | 10/1971 | Knott | 361/31 |
| 3,851,216 | 11/1974 | Clarke et al. | 361/31 |
| 4,048,662 | 9/1977 | Burguburu | 361/31 |
| 4,191,915 | 3/1980 | Johansson | 318/484 |
| 4,383,206 | 5/1983 | Matsuoka et al. | 49/28 |
| 4,438,972 | 3/1984 | Katayama et al. | 296/223 |
| 4,468,063 | 8/1984 | Yukimoto et al. | 296/223 |

FOREIGN PATENT DOCUMENTS

| | | |
|---|---|---|
| 1166021 | 1/1968 | United Kingdom . |
| 1160202 | 2/1968 | United Kingdom . |
| 1384974 | 2/1973 | United Kingdom . |

Primary Examiner—Robert B. Reeves
Assistant Examiner—Dennis H. Pedder
Attorney, Agent, or Firm—Oblon, Fisher, Spivak, McClelland & Maier

[57] ABSTRACT

A safety device for an electromechanical opening and closing mechanism, such as an automotive sun roof, which interrupts a circuit for driving the mechanism when a load on the circuit happens to exceed a certain set value in an abnormal case such as when a foreign object is caught in the mechanism. The set value is either a first set value which varies in accordance with the above-noted load or a second set value which is determined by the position of the movable part of the above-noted mechanism. The safety device functions when a load exceeds either of the two set values. The first set value is effective against a load variation, particularly a load decrease, to prevent a decrease in sensitivity decrease of the safety device, while the second set value is effective against an increase in load, particularly a slow increase, to prevent an overload on the mechanism. Thus, the safety device prevents damage to the mechanism and the foreign object caught in the mechanism, while the device maintains a high sensitivity.

9 Claims, 14 Drawing Figures

SAFETY DEVICE FOR ELECTROMECHANICAL OPENING AND CLOSING MECHANISM

BACKGROUND OF THE INVENTION

1. Field of the Invention

This invention relates to a safety device for an electromechanical opening and closing mechanism such as an automotive sun roof, and more particularly to a safety device which, when a foreign object is caught in the mechanism, interrupts the circuit for driving the mechanism to stop its motion.

2. Description of the Prior Art

The conventional safety device for an electromechanical opening and closing mechanism has been designed to detect a load current in the circuit for driving the mechanism as a load signal and interrupts the circuit when the load current exceeds a set value. For example, in a driving circuit containing a bimetal, when there flows a load current exceeding the allowable current which is determined by the bimetal, the circuit is instantly broken by the bimetal to stop the motion of the above-noted mechanism for preventing damage to the machine or driving circuit being caused by the overload or damage to a foreign object caught in the mechanism which is responsible for causing the overload on the driving circuit. Or, an analog electronic circuit is used for comparing a load signal with a set value. When a load signal exceeds a set value, the analog electronic circuit outputs a signal to the driving circuit for breaking of the circuit.

However, the above-noted conventional safety device has the following disadvantages. First, it cannot follow the variation of a load signal in the normal range and it has a low sensitivity for detection of an abnormal load. This disadvantage is caused by the fact that only one constant value is set as a criterion for detection of an abnormal load.

For example, a slide panel in an automotive sun roof requires a large driving force at the start of sliding when a large frictional resistance is induced. However, once the slide goes into a constant sliding state, only a small driving force is required due to a reduced frictional resistance. Yet, since the above-noted set value is a unvariable one, the set value should be determined to be above the range of the load variation. If the set value is set below the maximum value of the range of the load variation, the safety device will function even though no abnormality has occurred. On the contrary, if the set value is set constantly above the maximum value as described above, the difference between the set value and a signal value related to the load in the above-noted constant sliding state becomes so large that the safety device cannot detect a reasonable abnormality according to a variable load. The device becomes less sensitive.

Even in normal operation, since the frictional resistance exerted on the panel may also vary according to the position of the panel, the load on the slide panel may vary according to the position of the panel along the entire passage. For example, the force required to drive a panel is significantly different when the panel slides normally and constantly, suppresses deflector arms, or seals the opening after it slides over a link.

A second disadvantage of the conventional safety device is its simple function that at an abnormal load it interrupts the driving circuit and only stops the operation of the opening and closing mechanism.

In general, an abnormal load is applied to the opening and closing mechanism when a foreign object is caught or entrapped in the mechanism. Therefore, the foreign object must be removed to eliminate the abnormal load. The removal is generally more convenient when the slide panel is slides back a little before the stoppage of the mechanism. Since the conventional safety device does not have such sliding back function, it is often difficult to remove a foreign object.

SUMMARY OF THE INVENTION

The present invention provides two set values as criteria to detect an abnormal load in order to overcome the first disadvantage described above. A preferred embodiment of the present invention to overcome the second disadvantage described above involves a backward operation mechanism of an opening and closing mechanism for a certain period immediately after detecting an abnormal load.

Accordingly, a first object of the present invention is to provide two set values as criteria for detection of an abnormal load on a safety device for an opening and closing mechanism, in order to improve the precision of detection of an abnormal load.

The first set value varies in accordance with a load level. Therefore, the difference between the level of a load signal (which expresses a physical quantity related to a load) and that of the first set signal (which expresses the first set value) is kept almost constant as long as the load variation is within a normal range. Namely, the sensitivity of detection of an abnormal load is kept almost constant.

A second set value is determined corresponding to the position of a moving member of an electromechanical opening and closing mechanism. For example, in an automotive sun roof mechanism, the second set value takes a constant value of $a_1$ while a slide panel is located in a normal moving route, another constant value of $a_2$ ($a_2 \neq a_1$) when the panel suppresses a deflector arm, and still another constant value of $a_3$ ($a_2 \neq a_3 \neq a_1$) when the panel raises a link to seal the roof. The second set value functions to compensate for the disadvantage of provision of only the first set value, which cannot detect an abnormal value attained after a slow increase of the load. With provision of the second set value, such abnormal value can be detected.

A second object of the present invention is to provide a circuit for masking a rush current in order to prevent an erroneous operation of a safety device which may occur due to rush current in starting of a motor.

A third object of the present invention is to make backward motion of an opening and closing mechanism after stoppage of the mechanism by action of a safety device, in order to facilitate removal of a foreign object caught in the mechanism.

BRIEF DESCRIPTION OF THE DRAWINGS

By way of example and to make the description more clear, reference is made to the accompanying drawings in which.

DETAILED DESCRIPTION OF THE INVENTION

The first object of the present invention, described above, is achieved in the following way.

Figure 1:
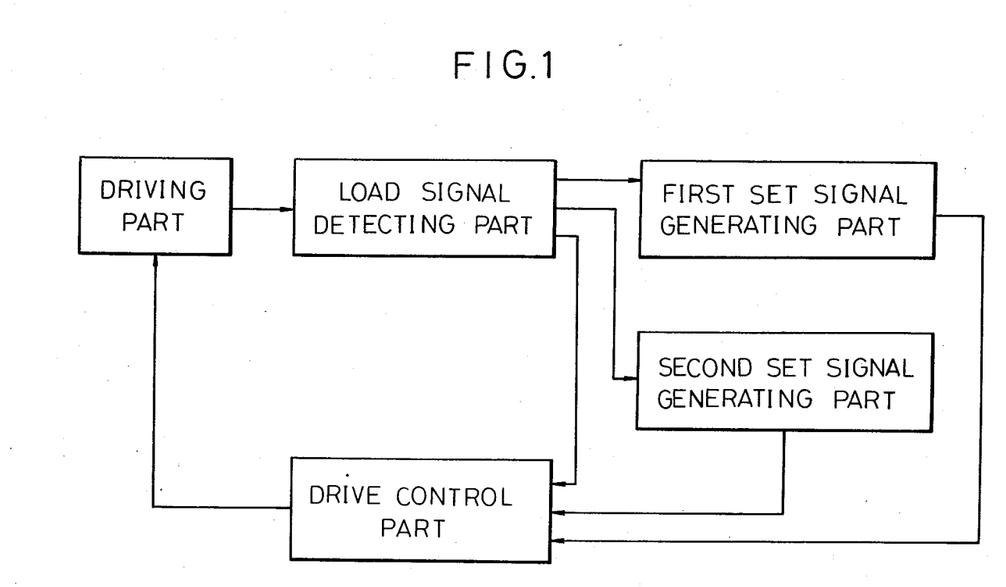
FIG. 1 is a block diagram of an electronic circuit in the present invention.

As shown in FIG. 1, the electrical circuit of the safety device according to the present invention includes a set signal generating part including a first set signal generating part and a second set signal generating part in a conventional circuit including a driving part, a load signal detecting part, a drive control part and a set signal generating part which generates a set signal as a criterion for decision of an abnormal load.

The driving part includes an electric motor driving an electromechanical opening and closing mechanism and a circuit for driving the motor.

The load signal detecting part detects a physical quantity related to a load on the above-noted drive motor, converts it into an electric signal and transmits the signal to the first and second set signal generating parts and the drive control part. Detection of the physical quantity related to a load can be made by a conventional method. For example, a resistance is inserted in the above-noted drive cicuit and a voltage across the resistance is detected. The detected voltage is smoothed and amplified in well-known circuits and taken out as a load signal f(t).

The first set signal generating part receives the load signal, f(t), and outputs a first set signal, $f(t+\tau)+a$, to the drive control part. The signal, $f(t+\tau)+a$, is set to be higher by a certain level "a" than the load signal, f(t), and follows it with a delay of a certain time "$\tau$". The first set signal, $f(t+\tau)+a$, is provided to prevent decrease of sensitivity in detection of an abnormal load, by provision of a good follow after a load variation in the normal range. Since the first set signal, $f(t+\tau)+a$, follows the variation of a load signal, f(t), as described above, the difference between the load signal, f(t), and the first set signal, $f(t+\tau)+a$, at the same time is kept almost constant as long as the variation of a load signal is within a normal range. Therefore, the sensitivity of the safety device is kept almost constant. The first set signal, $f(t+\tau)+a$, can be typically obtained by adding a voltage of "a" to a load signal, f(t), by the use of an adding circuit and then delaying it "$\tau$" by the use of a delay circuit.

The second set signal generating part memorizes a load signal f(t) at a specified time "$t_1$" and continues to output a second set signal, g(t), where $g(t)=f(t_1)+b$, to the drive control part until another specified time "$t_2$". The set level, $f(t_1)+b$, is different from the memorized level, $f(t_1)$, by a certain value "b". At the second specified time "$t_2$" the second set signal g(t) is changed to $f(t_2)+b$. Further, the second set signal generating part continues to output the new signal, $f(t_2)+b$, as the new second set signal, g(t), until a third specified time "$t_3$". The above-noted specified times, $t_1$, $t_2$, $t_3$, - - -, are the times when a load is remarkably changed due to a change of the fundamental state of the movable member of an electromechanical opening and closing mechanism. For example, in an automotive sun roof, the load changes remarkably when the slide panel moves from the normal moving route to a place where the panel suppresses down the deflector arm. The time of the suppression corresponds to one of the above-noted specified times. In addition, the time when the slide begins to move along the normal moving route is also one of the specified times. Accordingly, the specified times $t_1$, $t_2$, $t_3$, - - - indicate turning points of sliding mode, and g(t) is also a function of the position of the slide panel.

The second set signal, g(t), functions to compensate for the disadvantage of the first set signal, $f(t+\tau)+a$. For example, the first set signal, $f(t+\tau)+a$, cannot be used to detect an abnormal load which has been attained after a gradual load increase. Namely, if the rate of load increase is lower than a constant, $a/\tau$, determined by the above-noted delay time, $\tau$, and level difference, a, which are elements used for determination of $f(t+\tau)+a$, the first set signal, $f(t+\tau)+a$, cannot be used to detect an abnormal signal at any high level. Therefore, the second set signal, g(t), is provided in order to detect such slow load increase as described above. The level of the second set signal, g(t), is changed appropriately in accordance with the fundamental change of the positional states of the above-noted movable member. The fundamental change of the positional states can be detected by provision of a limit switch, a lead switch, a potentiometer, a linear switch, a photo switch, etc. in the opening and closing mechanism. The second set signal generating part memorizes a load signal, $f(t_n)$, at a time, $t_n$, when any of the above-noted positional changes occurs, changes it by a certain level, b, if necessary, and outputs the modified signal, $f(t_n)+b$.

The drive control part receives a load signal, f(t), and the first and second set signals, $f(t+\tau)+a$ and g(t), performs a comparison function, and outputs a stop signal to the driving part if the load signal, f(t), is higher than either of the first and second set signals.

As has been described so far, the first object of the present invention can be achieved to provide a highly precise safety device without being affected by the performance variation among motors and degradation of the motor characteristics.

The second object of the present invention can be achieved by provision of a rush current masking circuit in one or more of the load signal detecting part, the first set signal generating part, the second set signal generating part and/or the drive control part. For example, when the masking circuit is provided in a load signal detecting part, a load signal is not detected for a certain period after starting of motor rotation and the drive control part is thereby prevented from producing the above-noted stop signal. Therefore, a rush current is not detected and the safety device will not function.

The third object of the present invention can be achieved by providing the drive control part with a function to output a signal to make a backward drive for a certain period after output of a stop signal.

The present invention will now be described in detail by reference to the embodiment which is application of the present invention to an automotive sun roof mechanism.

DESCRIPTION OF THE PREFERRED EMBODIMENT

Figure 2:
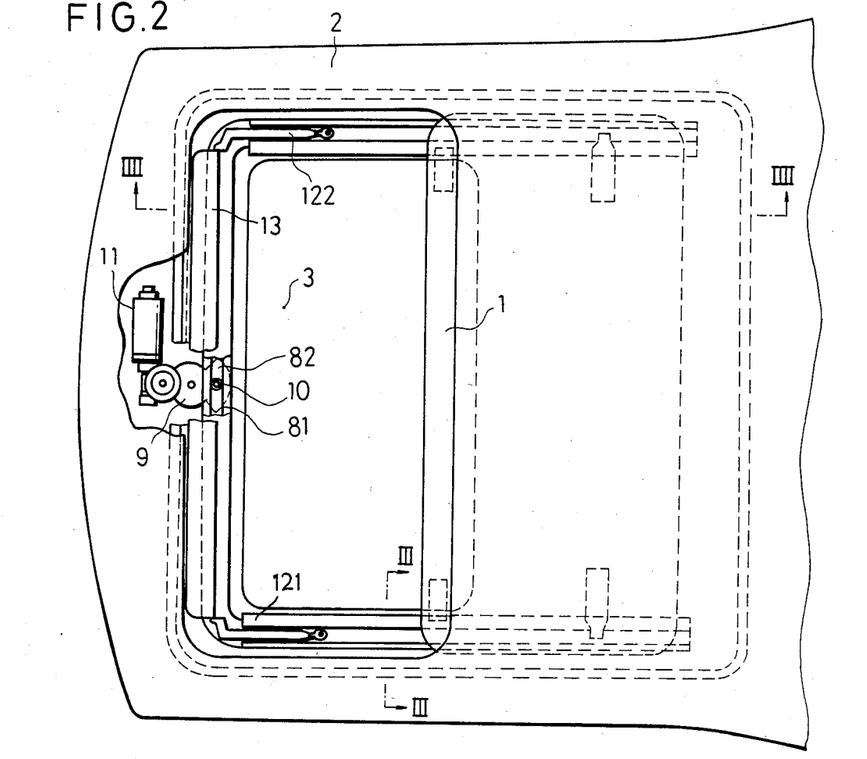
FIG. 2 is a plan view outlining the opening and closing mechanism of a sun roof mounted on an automotive roof.
Figure 3:
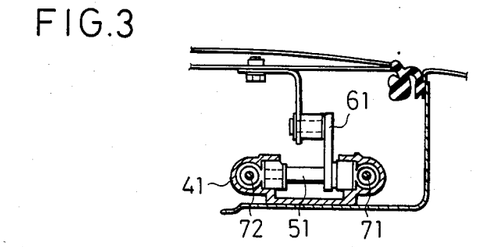
FIG. 3 is a cross-sectional view along III—III line in FIG. 2, showing the closed state of the slide panel.
Figure 4:
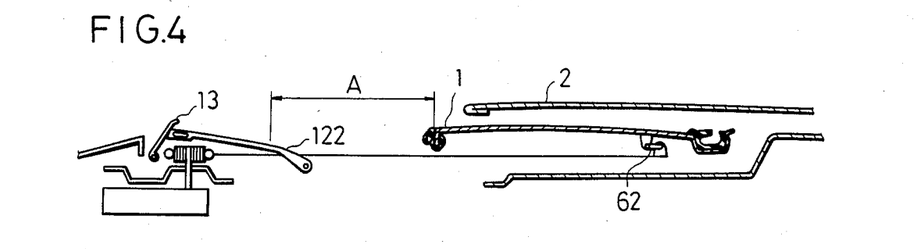
FIG. 4, FIG. 5 and FIG. 6 are cross-sectional views along IV—IV line in FIG. 2.
Figure 5:
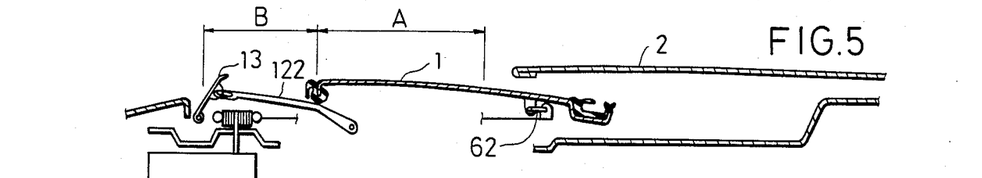
Figure 6:
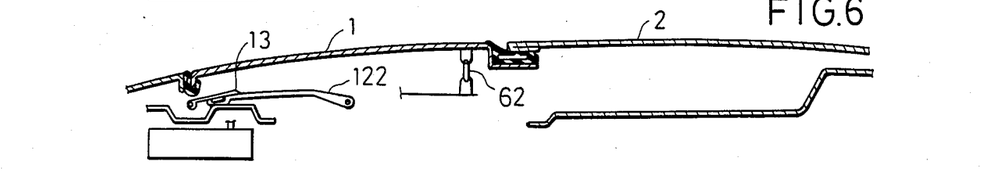

FIG. 2 shows a slide panel 1 mounted on an automotive sun roof. FIG. 3 is a cross-sectional view along III—III line in FIG. 2. FIG. 4, FIG. 5 and FIG. 6 are cross-sectional views along IV—IV line in FIG. 2 for different positions of the slide panel.

A roof 2 of the car is provided with an opening 3, which can be opened and closed by the slide panel 1. The slide panel 1 is movably connected via link 61 with a shoe 51 and via link 62 with the other shoe. (The other shoe is not shown in FIG. 3 or in FIG. 4). The both shoes are slidable along guide rail 41, mounted on both ends of the opening 3. Here, the direction of sliding is the longitudinal direction of the car.

Cables 71, 72 are fixed to the shoe 51, and they are also linked to toothed cables 81, 82. The toothed cables 81, 82 engage a gear 10, and thereby are connected to a reducer 9. The input shaft of the reducer 9 is connected with a rotational shaft of a D.C. motor 11. In forward rotation of the motor 11, the gear 10 drives the toothed cables 81, 82 in the closing direction of the panel 1, and in backward rotation of the motor 11, the gear 10 drives the toothed cables 81, 82 in the opening direction of the panel 1. In front of the opening 3, an air scoop plate 13 supported by arms 121, 122 is mounted to be freely inclined. Clockwise rotational foces are applied to the arms 121, 122 by leaf springs (not shown).

In full opening of the panel 1 as shown in FIG. 4, the arms 121, 122 receive forces from the leaf springs and erect the air scoop plate 13. Forward rotation of the motor 11 makes the panel 1 advance and after travel of a certain distance A, the front end of the panel 1 contacts with the upper surfaces of the arms 121, 122, as shown in FIG. 5. With further advance of the panel 1, the panel front end depresses the arms 121, 122, followed by clockwise rotation of the air scoop plate 13. Then, the front end of the panel 1 advances over the air scoop plate 13 and at last the opening 3 is completely closed as shown in FIG. 6.

Figure 7:
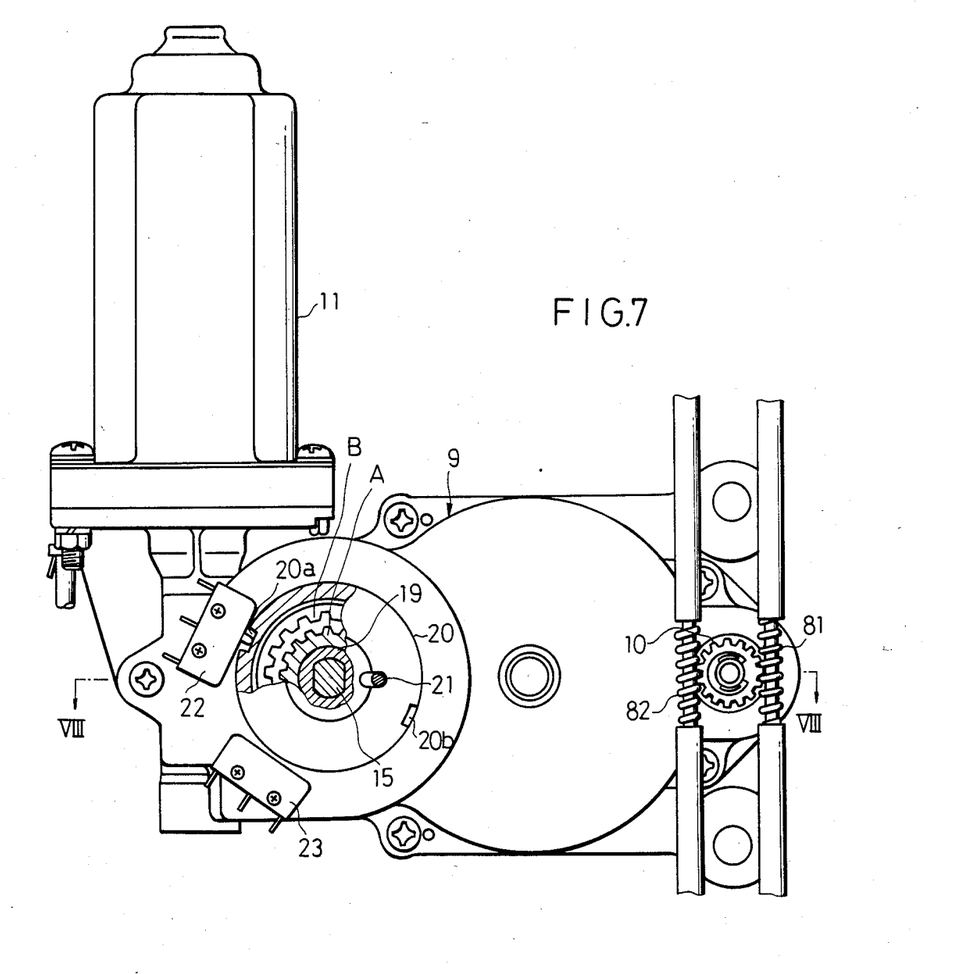
FIG. 7 is an enlarged plan view of the reducer shown in FIG. 2.
Figure 8:
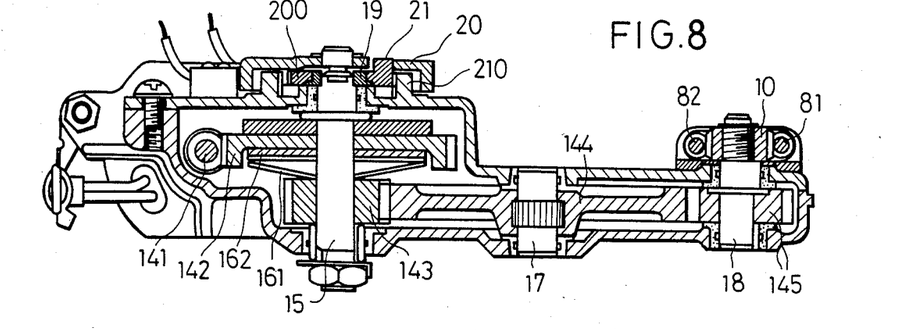
FIG. 8 is a cross-sectional view along VIII—VIII line in FIG. 7.

FIG. 7 is an enlarged plan view of the reducer 9. FIG. 8 is a cross-sectional view of the reducer 9 along VIII—VIII line in FIG. 7.

The reducer 9 comprises a worm gear 141, fixed to the rotational shaft of the motor 11, a worm wheel gear 142 which engages with the worm gear 141 and is movably mounted to a rotational shaft 15, a gear 143 connected to the gear 142 via a frictional clutch 162 including a dish spring 161 and fixed to the rotational shaft 15, a large diameter gear 144 engaging with the gear 143, a gear 145 engaging with the gear 144 and fixed to a rotational shaft 18, and a gear 10 fixed to the rotational shaft 18 and engaging with the toothed cables 81, 82.

Figure 9:
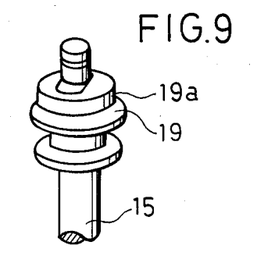
FIG. 9 is a stereographic enlarged view of a part of the rotational shaft.

An eccentric bearing 19 with an eccentric circular periphery 19a is fitted to the tip of the rotational shaft 15 as shown in FIG. 9 and a cam 20 is movably mounted on the periphery 19a. A sun gear 210 is fixed to the eccentric bearing 19. The sun gear engages with a planetary gear 200. A pin 21 is formed on the planetary gear 200. A through hole is formed in the cam 20 and the pin 21 is fitted into the hole.

Thus, with rotation of the bearing 19 caused by rotation of the rotational shaft 15, the planetary gear 200 engages with the in-housing sun gear 210 and rotates differentially. Then, the cam 20 is pushed by the pin 21 and rotates.

Two grooves 20a, 20b are formed oppositely (here, the groove 20a is formed at the underside of the cam 20 and the groove 20b is formed at an overside) on the peripheral surface of the cam 20 and two limit switches 22, 23 are provided to correspond to the grooves 20a, 20b, respectively.

The cam 20 and the limit switches 22, 23 function to indicate fundamental changes in the positional states of the sun roof in the formulation of the second set signal g(t) above described, as will be explained by reference to FIGS. 10, 11 and 12, which correspond to FIGS. 4, 5 and 6, respectively.

When the panel 1 is fully opened (FIG. 4, FIG. 10), the push rods of the both limit switches 22, 23 are pushed. At the time, the limit switch 22 is closed and the limit switch 23 is open.

Figure 10:
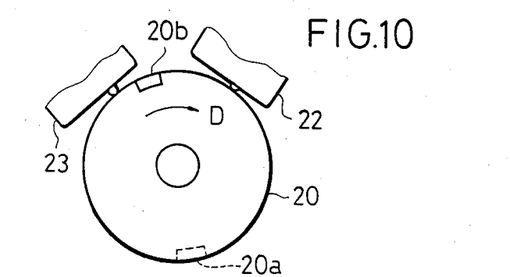
FIG. 10, FIG. 11 and FIG. 12 are plan views showing the relative positions of the cam and limit switches of the reducer.

When the motor 11 is driven so that the panel 1 may be closed, the cam 20 rotates in the D direction as shown in FIG. 10, and when the panel 1 runs on the arms 121, 122 (FIG. 5, FIG. 11), the push rod of the limit switch 22 is fitted into the groove 20a and the limit switch 22 is opened. When the motor 11 is further driven, the panel 1 will advance towards the fully closed position (FIG. 6). However, immediately before the panel 1 is fully closed, the push rod of the limit switch 23 is fitted into the groove 20b and the switch 23 is closed (FIG. 12).

As understood from the above description, the limit switch 22 is always closed except when the push rod of the switch 22 is fitted in the groove 20a, and the limit switch 23 is always open except when the push rod of the switch 23 is fitted in the groove 20b.

When the cable 81 or the cable 82 is stopped and restricted by a force larger than a certain value, the frictional clutch 162 makes a slide and the gear 142 is made to rotate by the motor 11, but the shaft 15 and the gear 143 fixed thereto will not rotate. Namely, the clutch 162 is provided as a kind of mechanical safety device.

Figure 13:
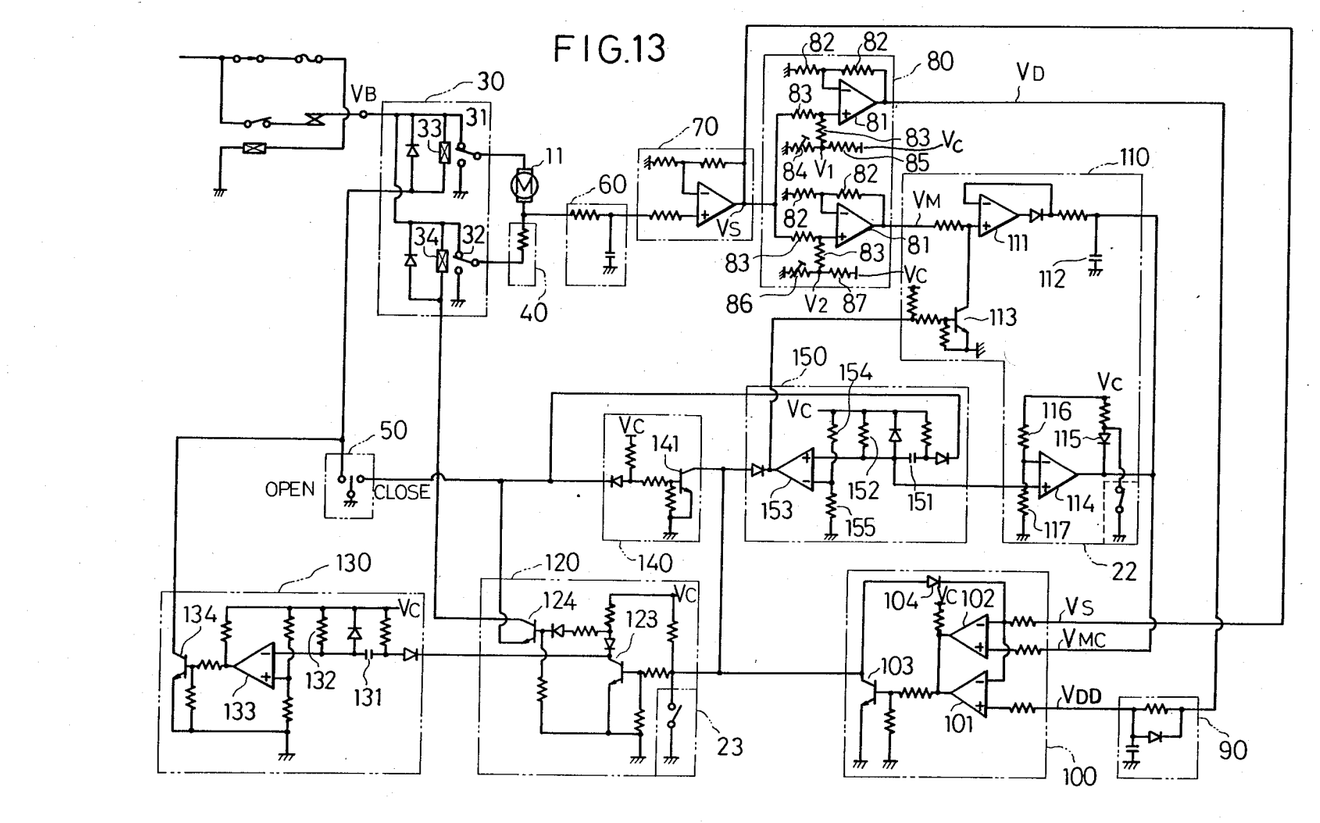
FIG. 13 is an electronic circuit for driving the motor for opening and closing the panel.

FIG. 13 shows an electronic circuit for controlling forward and reverse operation of the motor 11 (control of the opening and closing positions of the panel 1).

One terminal of the motor 11 is connected to a power source with a voltage $V_B$ or a chassis ground through a relay 31 of a motor driving circuit 30, while another terminal of the motor 11 is connected to the power source with a voltage $V_B$ or chassis ground through a resistance 40 and through a relay 32. The relay 31 and the relay 32 are activated by a relay driver 33 and a relay driver 34, respectively. In this embodiment of the present invention, the motor driving circuit 30 constitutes an electric driver and the resistance 40 constitutes a means for detecting a load of the motor 11.

When a switch 50 for opening and closing the sun roof is turned to the opening side, the relay driver 33 is turned on, and current flows via the power source with a voltage $V_B$, the relay 31, the motor 11, the resistance 40, the relay 32 and the chassis ground, to make backward rotation of the motor 11.

When the switch 50 is turned to the closing side, the relay driver 34 is turned on and current flows via the power source with a voltage $V_B$, the relay 32, the resistance 40, the motor 11, the relay 31 and the classis ground to produce forward rotation of the motor 11. At this time, a load signal corresponding to a load current of the motor 11 is taken out of one terminal of the resistance 40 and applied to an amplifier 70 through a filter circuit 60. The output $V_S$ of the amplifier 70 is applied to a summing operational circuit 80.

The summing operational circuit 80 is constituted of two sections. One section's output is entered into a delay circuit 90, and another section's output is entered into a memory circuit 110.

Namely, the output $V_D$ of the one operational amplifier 81 (which corresponds to the above-noted one section's output) is applied to the delay circuit 90.

Here, the set value of the output $V_D$ is described by: $V_D = V_S + V_1$, for, the non-inverting input terminal (+) of the one operational amplifier 81 receives an output $V_S$ of the amplifier 70 and a shunt voltage $V_1$ of a constant power source voltage $V_c$ divided by resistances 84, 85 through resistances 83, 83 respectively, and the inverting terminal (−) is connected to the output terminal and the chassis ground through resistances 82, 82.

Another section is constituted of an another operational amplifier 81, resistances 82, 82, 83, 83, 86, 87, and the constant power source with voltage $V_C$, and another section's output $V_M$ is entered into the memory circuit 110. Here, the set value of $V_M$ is described by: $V_M = V_S + V_2$, for the operational amplifier 81 receives the output $V_S$ and a shunt voltage $V_2$ of the voltage $V_C$ devided by resistances 86, 87.

The set voltage $V_D$ is delayed to become $V_{DD}$, which corresponds to $f(t+\tau)+a$ previously described, in the delay circuit 90 and applied to the non-inverting input terminal (+) of operational amplifier 101 of an overload detection circuit 100.

The set voltage $V_M$ is applied to the non-inverting input terminal (+) of an operational amplifier 111 of the memory circuit 110. Since the operational amplifier 111 constitutes the peak detector circuit, a peak value of the set voltage $V_M$ is held by a condenser 112. A voltage $V_{MC}$ held by the condenser 112 is applied to the non-inverting input terminal (+) of an operational amplifier 102 of the overload detection circuit 100.

The output Vs of the operational amplifier 70 is applied to the inverting input terminals (−) of the operational amplifiers 101, 102.

The output terminals of the operational amplifiers 101, 102 are both connected to the base of a transistor 103. The collector of the transistor 103 is connected to the inverting input terminals (−) of the operational amplifiers 101, 102 through a diode 104. And, the collector is connected to the base of a transistor 121 of a motor stop circuit 120.

The motor stop circuit 120 consists of transistors 123, 124, and the collector of the transistor 123 is connected to the base of the transistor 124. The transistor 124 branches to the closing terminal of the switch 50 for opening and closing the sun roof and to the relay driver 34. The switch 23 serves as a limit switch. The output of the motor stop circuit 120 is generated from the collector of the transistor 123 and applied to a motor reversing circuit 130.

The output of the motor stop circuit 120 is applied to the inverting input terminal (−) of the operational amplifier 133 via a condenser 130 and a resistance 132. The output terminal of the operational amplifier 133 is connected to the base of a transistor 134, and the collector of the transistor 134 is connected to the relay driver 33.

A detection circuit 140 for opening and closing the sun roof is formed of a transistor 141 whose collector is connected to the motor stop circuit 120, and whose base is connected to the closing terminal of a switch 50 for opening and closing the sun roof. In a motor rush current masking circuit 150, a signal from the closing terminal of the switch 50 for opening and closing the sun roof is applied to the non-inverting input terminal (+) of the operatonal amplifier 153 via a condenser 151 and a resistance 152. The output of the operational amplifier 153 is applied to the motor stop circuit 120. The output terminal of the operational amplifier 153 is connected to a base of a transistor 113 in the memory circuit 110. One terminal of the condenser 151 is connected to the non-inverting input terminal (+) of the operational amplifier 114 in the memory circuit 110.

The limit switch 22 is connected to the output terminal of an operational amplifier 114 via a diode 115.

The operational amplifiers, 101, 102, 114, 133 and 153, have an open collector type output step.

The operation of this embodiment will be explained by reference to the above-noted construction.

(1) Opening of the sun roof

In opening of the sun roof, when the switch 50 for opening and closing the roof is turned to the opening side, the relay driver 33 is turned on and the motor 11 rotates backwardly to initiate opening of the slide panel 1.

In this opening operation, the safety device of this embodiment does not work.

(2) Closing of the sun roof

When the switch 50 for the roof opening and closing is turned to the closing side, the transistor 124 is turned on, the relay driver 34 is turned on and the motor 11 initiates forward rotation. At this time, the transistor 141 of the detection circuit 140 for switch opening and closing is turned off, and the collector of the transistor 141 keeps this state while the switch 50 for the roof opening and closing is turned to the closing side. Because the potential of one terminal of the condenser 151 in the mask circuit 150 takes the ground level, the potentials of both terminals of the condenser 151 instantly take the ground level and the output of the operational amplifier 153 takes the "L" (logic low) level. Similarly, the output of the operational amplifier 114 in the memory circuit 110 takes "L" level. When the condenser 151 is charged via a resistance 152, and the voltage across the condenser 151 reaches a standard voltage determined by the resistances 154, 155, the output of the operational amplifier 153 returns to the "H" level (logic high).

Similarly, the output of the operational amplifier 114 returns to the "H" level when the voltage across the condenser 151 reaches a standard voltage determined by the resistances 116, 117.

Since the standard voltage of the operational amplifier 153 is set to be higher than that of the operational amplifier 114, the output of the operational amplifier 114 reaches the "H" level in advance of that of the amplifier 153. In this embodiment of the present invention, the holding time during which the output of each operational amplifier is kept at the "L" level is set to be 0.3 sec and 0.2 sec for the operational amplifier 153 and the operational amplifier 114, respectively.

While the output of the operational amplifier 153 is kept at the "L" level, the transistor 113 in the memory circuit 110 is in the off state and the collector circuit of the transistor 113 is open. At the start of rotation of the motor 11, when a large current flows due to a rush current, $V_S > V_{DD}$ and the overload detection circuit 100 starts to function. Namely, since the output of the operational amplifier 101 reaches the "L" level, the transistor 103 turns off and the collector circuit becomes open. However, the motor stop circuit 120 will not function because the output of the masking circuit 150 has reached the "L" level as mentioned above.

Because the transistor 113 in the memory circuit 110 is in the off state, the voltage level VM is likely to be applied to the condenser 112. However, since the output of the operational amplifier 114 is at the "L" level at the time, charging (memory) to the condenser 112 is prohibited. Afterwards, from the time when the operational amplifier 114 outputs the "H" level, charging to the condenser 112 is initiated and continued until the output of the masking circuit 150 is turned to the "H" level. Namely, the set voltage $V_{MC}$ memorized in the memory circuit 110 is the voltage $V_M$ between 0.2 sec and 0.3 sec after the rotation of the motor 11 is initiated.

Figure 11:
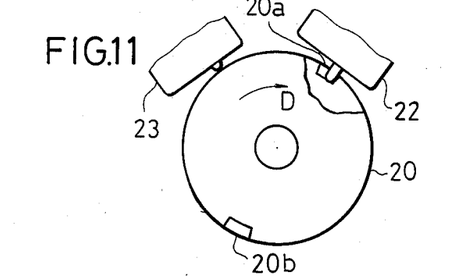
Figure 12:
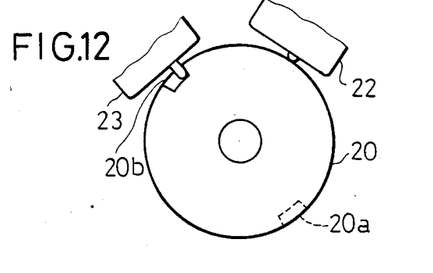

When the slide panel 1 contacts the deflector arms 121, 122 after proper motion of the panel (FIG. 5), the limit switch 22 turns off (FIG. 11).

At this time, the condenser 112 is charged through the diode 115 by the power source with a constant voltage $V_C$, and the set voltage $V_{MC}$ raised. A new set voltage $V'_{MC}$ is determined by the charge time, which is further determined by the width of the groove 20a of the cam 20.

When the slide panel 1 moves further to the closing direction and the limit switch 23 fits in the groove 20b of the cam 20 (FIG. 12), the limit switch 23 is turned on to keep the transistor 123 in the motor stop circuit 120 in the off state. Therefore, even if the slide panel 1 immobilizes the deflector arms 121, 122 and the overcurrent detection circuit 100 detects a large current required for transition to the sealed state, the motor stop circuit 120 will not operate.

Figure 14:
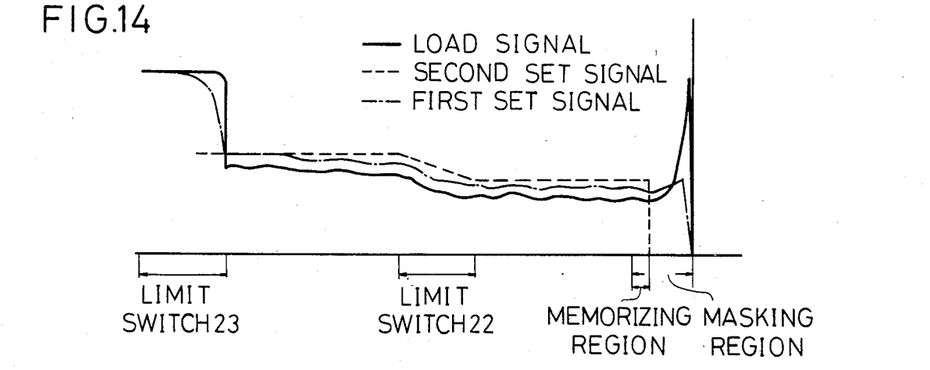
FIG. 14 is a graph showing the current for motor driving (load signal), the overcurrent set by the memory circuit (second set signal), and the overcurrent set by the delay circuit (first set signal).

FIG. 14 shows variation of the load current of the motor 11 while the panel 1 is properly moved from the fully open state to the fully closed state. The load current of the motor 11 shows a similar variation when the panel 11 is moved from the fully closed state to the fully open state, but the motor starting current at the fully closed state is higher than that shown in FIG. 14 and the motor current just prior to the motor stoppage is lower than that shown in FIG. 14. When the motor 11 is once stopped in a state other than the fully opened or closed state of the panel 1 and then driven to make the panel 1 move towards the fully opened or closed position, the motor starting current becomes higher than the level in steady motion of the panel 1 as shown in FIG. 14.

When foreign matter happens to get between the closing slide panel 1 and a roof, and an overload is applied to the motor 11, the overload detection circuit 100, serving also as the above described drive control part, will function. With function of the overload detection circuit 100, the collector of the transistor 103 changes its state from the "L" level to the open state, and the transistor 123 in the motor stop circuit 120 turns on. As a result, the transistor 122 turns off and the relay driver 34 is turned off to cause the stoppage of the motor 11.

In addition, because the transistor 123 turns on, one terminal of the condenser 131 in the motor reversing circuit 130 instantly takes the ground level and the output of the operational amplifier 133 turns from the "L" level to the "H" level. Therefore, the transistor 134 turns on and the relay driver 33 is turned on. As a result, the motor 11 will rotate reversely and the slide panel 1 will open.

Afterwards, the condenser 131 is charged via the resistance 132. Therefore, after a certain time, the output level of the operational amplifier 133 returns from the "H" level to the "L" level and the transistor 134 turns off to stop the motion of the motor 11. As described so far, detection of an overload to the motor 11 leads to a halt of the slide panel 1.

A diode 104 is provided in the overload detection circuit 100 to prevent an erroneous operation due to chattering caused by a reversed electromotive force of the motor 11 when the motor stops.

In this embodiment of the invention, the voltage set by the memory circuit is designed to be varied in two stages by switching a limit switch. However, switching in three or more stages is also possible in accordance with the uses of a user. In addition, this embodiment is concerned with the safety device for the sun roof of a car, however, the present invention can be similarly applied to other parts of the car, which are rotationally or reciprocally driven by electromechanical mechanisms, such as automotive seats, side windows, and mirrors.

What we claim is:

1. A safety device for an electromechanical opening and closing mechanism with a mobile member, comprising:
   driving means for driving said mobile member,
   load signal detecting means connected to said driving means for detecting a load applied to said driving means and for producing a load signal corresponding thereto,
   set signal generating means connected to said load signal detecting means for generating set signals as criteria for judging abnormal loads, and
   drive control means connected to said load signal detecting means and said set signal generating means for comparing the load signal from said load signal detecting means with set signals from said set signal generating means and controlling said driving means in accordance with the result of said comparison;
   said set signal generating means comprising,
   first set signal generating means for generating a first set signal which is higher than said load signal by a predetermined level and follows said load signal after delay of a predetermined time period,
   second set signal generating means for generating a second set signal with a level determined by predetermined positions of said mobile member,
   said drive control means including means for applying to said driving part a stop signal when the level of said load signal exceeds either of said first set signal and said second set signal.

2. A safety device as recited in claim 1, wherein said electromechanical opening and closing mechanism is an automotive sun roof mechanism and said mobile memeber is a slide panel of said sun roof mechanism.

3. A safety device as recited in claim 1, wherein said second signal generating means includes means for generating said second set signal with a level corresponding to a first position while said mobile member moves from a first position to a second position, and means for changing the level of the second set signal to a respective level corresponding to a predetermined position each time when said mobile member passes through the predetermined position and for outputting a respective second set signal level at the respective position.

4. A safety device as recited in claim 1, wherein said drive control means comprises a masking circuit to inhibit said comparison for a predetermined time period after starting of said driving means.

5. A safety device as recited in claim 1, wherein said drive control means comprises a circuit which outputs a signal for backward operation to said driving means immediately after output of said stop signal and after a predetermined time period outputs a stop signal again.

6. A safety device as recited in claim 4, wherein said second set signal generating means comprises a circuit which prevents generation of said second set signal level for a predetermined time period from starting of said driving means.

7. A safety device as recited in claim 3, wherein said mobile member is a slide panel in an automotive sun roof mechanism, said predetermined position is a position where the front end of said slide panel contacts an arm which rotatably supports an air deflector plate of said sun roof mechanism, and a circuit is provided to raise the level of said second set signal by a predetermined amount after said panel arrives at the position of contact.

8. A safety device as recited in claim 1, comprising a resistor inserted in circuit with said driving means for detecting said load of said driving means.

9. A safety device as recited in claim 1, wherein said first set signal generating means comprises means for raising the level of said load signal, including a delay circuit for delaying said load signal, and a summing operational circuit having applied thereto the load signal and an output of said delay circuit.

* * * * *